(12) United States Patent
Iulian (10) Patent No.: US 7,652,453 B2
(45) Date of Patent: Jan. 26, 2010

(54) TOPOLOGY FOR A POSITIVE BUCK-BOOST SWITCHING REGULATOR

(75) Inventor: Mirea Iulian, Singapore (SG)

(73) Assignee: Broadcom Corporation, Irvine, CA (US)

( * ) Notice: Subject to any disclaimer, the term of this patent is extended or adjusted under 35 U.S.C. 154(b) by 167 days.

(21) Appl. No.: 11/976,714

(22) Filed: Oct. 26, 2007

(65) Prior Publication Data

US 2009/0108820 A1 Apr. 30, 2009

(51) Int. Cl.
*G05F 1/62* (2006.01)
*G05F 1/618* (2006.01)

(52) U.S. Cl. ............ 323/259; 323/284; 323/299

(58) Field of Classification Search ......... 323/224, 323/225, 259, 268, 271, 282, 284, 285, 299, 323/300, 344, 350
See application file for complete search history.

(56) References Cited

U.S. PATENT DOCUMENTS 7,495,419 B1 * 2/2009 Ju ..................... 323/259

* cited by examiner

*Primary Examiner*—Gary L Laxton
(74) *Attorney, Agent, or Firm*—Sterne, Kessler, Goldstein & Fox P.L.L.C.

(57) ABSTRACT

A new topology for a buck-boost switching regulator is provided herein. Embodiments provide an efficient buck-boost switching regulator that provides a regulated output voltage from an unregulated input voltage. Embodiments include a buck-boost switching regulator topology, where the operating mode is determined separately from the pulse-width modulated (PWM) control signal. This topology, in one embodiment, provides a better transient response than typical buck-boost switching regulator topologies, where PWM control circuitry and operating mode circuitry are combined. Furthermore, embodiments provide a buck-boost switching regulator that allows for high efficiency when the output voltage is close to the input voltage.

17 Claims, 9 Drawing Sheets

TOPOLOGY FOR A POSITIVE BUCK-BOOST SWITCHING REGULATOR

BACKGROUND

The present invention relates generally to switching regulators. More particularly, the invention relates to a new topology for a positive buck-boost switching regulator.

Buck-boost switching regulators are a common solution to the problem of providing a regulated output voltage from a widely varying input voltage. They are frequently implemented in battery powered electronic devices to regulate the battery output voltage which, during charging and discharging, can be greater than, less than, or substantially the same as the desired output voltage.

Conventional buck-boost switching regulators generally have one or more power switches and an inductor-capacitor (LC) filter coupled between an unregulated input and a regulated output via power switches. A control circuit selects the buck-boost switching regulator configuration (i.e., the operating mode) by controlling switch positions of the power switches and the duration of time during which switch positions remain unchanged.

Depending on the switch configurations, the buck-boost switching regulator can operate as one of three distinct converter types: a buck converter, a boost converter, or a buck-boost converter. A buck converter down-converts an input voltage to a lower output voltage. The power switches operating in a buck converter configuration alternately connect and disconnect the input voltage from the input of the LC filter. A boost converter, on the other hand, up-converts an input voltage to a higher output voltage. In the boost converter configuration, the input supply is continuously connected to the input of the LC filter, but the inductor of the LC filter is alternately connected and disconnected from the load where the regulated output voltage is applied. A buck-boost converter switches between the buck-converter configuration and the boost converter configuration.

A typical control circuit operates the buck-boost switching regulator as a buck converter, boost converter, or buck-boost converter depending on whether the input voltage is above, below, or substantially the same as the desired output voltage. Feedback is introduced to allow the control circuit to monitor the output voltage and adjust the switching regulator configuration accordingly. The control circuit operates to not only control the configuration the buck-boost switching regulator is operating in, but the duration of time the configuration remains unchanged. Controlling these two parameters allows the buck-boost switching regulator to regulate the output voltage at a desired reference voltage level.

A pulse-width modulated (PWM) control scheme is typically used to manage the time duration (i.e., duty cycle) the buck-boost switching regulator configuration remains unchanged, as well as the actual configuration the regulator operates in: buck, boost, or buck-boost. An error signal, proportional to the difference in output voltage and the desired reference voltage level, is used by the PWM controller in these determinations.

A disadvantage of this typical buck-boost switching regulator topology is that the configuration (i.e., the operating mode) of the switching regulator is determined within the PWM control circuit. The PWM control circuit typically contains a compensation network for stabilizing the feedback loop introduced when calculating the error signal. Switching from buck to boost is therefore dependent on the compensation network. As a result, the transient response of the buck-boost switching regulator is slow.

A further disadvantage of this typical buck-boost switching regulator topology is that the selection of the PWM controller is restricted by the necessity of the buck-boost switching regulator configuration (i.e., the operating mode) being determined within the controller.

Furthermore, typical buck-boost switching regulators maintain an average inductor current that is significantly larger than the required output current when the input voltage is close to the regulated output voltage. As a result, conduction losses are high and efficiency is decreased.

It would therefore be desirable to provide a high efficiency buck-boost switching regulator topology that separates the operating mode circuitry from the PWM control circuitry. It would also be desirable to provide a circuit for determining the operating mode of the buck-boost switching regulator that is not dependent on any feedback signals from the switching regulator circuit.

It would be further desirable to provide a buck-boost switching regulator topology that maintains the inductor current as close as possible to the output current. This reduces conduction losses and increases efficiency when the input voltage is close to the regulated output voltage.

SUMMARY

The present invention is directed to a new topology for a positive buck-boost switching regulator.

In one aspect of the invention, a positive buck-boost switching regulator topology is provided. The buck-boost switching regulator topology comprises an operating mode generator, a PWM controller, a switching circuit, and a switching regulator circuit. In one embodiment of the present invention, the switching regulator circuit is an efficient buck-boost switching regulator that provides a regulated output voltage from an unregulated input voltage that is higher, lower, or substantially the same as the desired output voltage.

In another aspect of the invention, the buck-boost switching regulator topology provides PWM control circuitry separate and distinct from operating mode circuitry. In an embodiment, the buck-boost switching regulator topology provides a better transient response than typical buck-boost switching regulator topologies, where the PWM control circuitry and operating mode circuitry are combined. The buck-boost switching regulator allows for the implementation of either a voltage control mode (VCM) or current control mode (CCM).

In another aspect of the invention, the buck-boost switching regulator topology provides PWM control circuitry separate and distinct from operating mode circuitry. In an embodiment, the buck-boost switching regulator topology provides a better transient response than typical buck-boost switch regulators, where the operating mode is dependent on a compensation network used in a PWM control circuit.

In another aspect of the invention, the buck-boost switching regulator topology maintains high efficiency for mid-range supply (i.e., when the input voltage is approximately the same as the regulated output voltage).

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Buck-Boost Switching Regulator Topology

Figure 1:
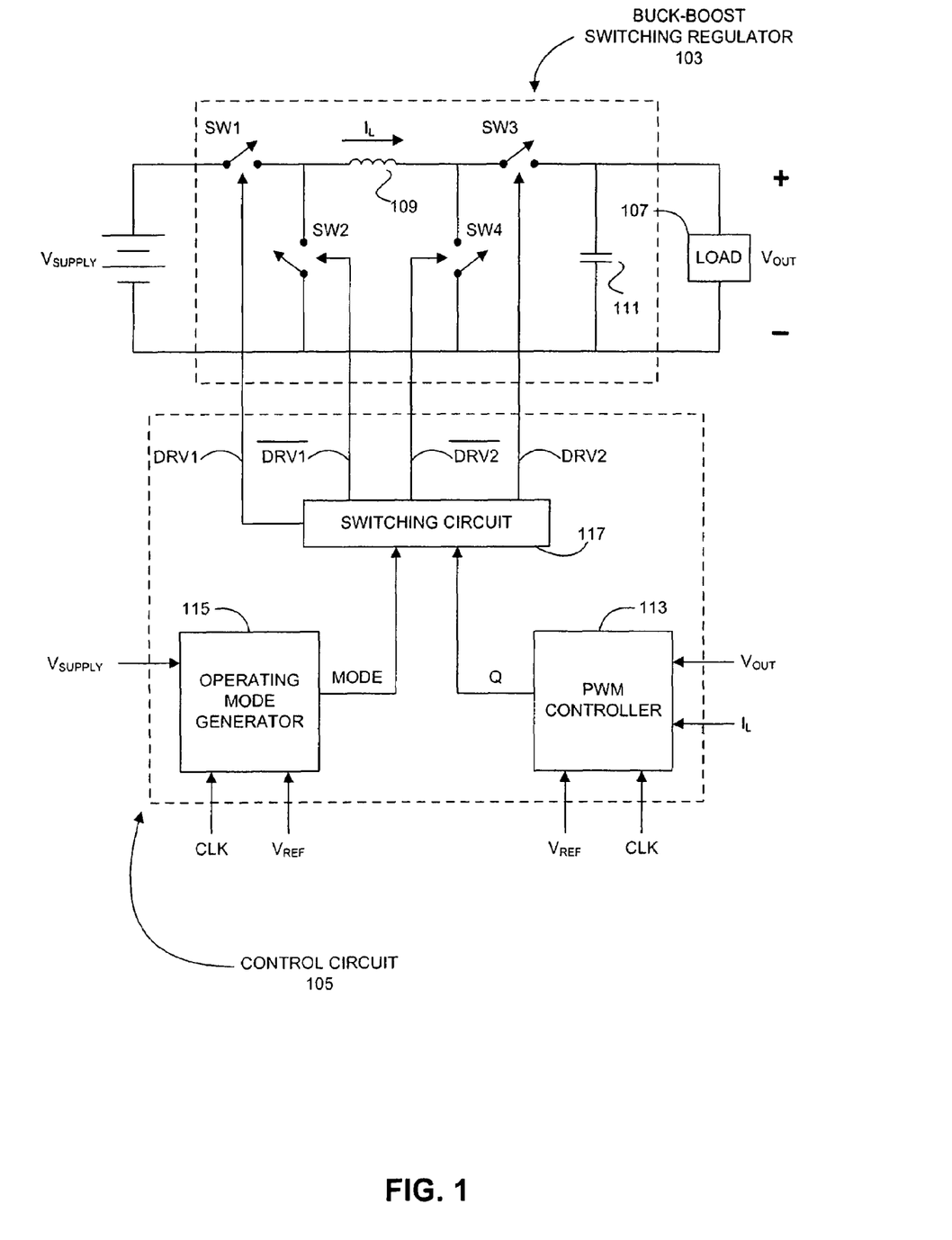
FIG. 1 is a block diagram of an illustrative embodiment of a topology for a buck-boost switching regulator and control circuit in accordance with the present invention

FIG. 1 is a block diagram of a topology for a buck-boost switching regulator and control circuit in accordance with the present invention. The topology of FIG. 1 comprises a buck-boost switching regulator 103 and a fixed-frequency control circuit 105. Buck-boost switching regulator 103 operates to maintain a regulated output voltage $V_{OUT}$ from an unregulated input voltage $V_{SUPPLY}$. The regulated output voltage $V_{OUT}$ is applied across a load 107. The input voltage $V_{SUPPLY}$ can be higher, lower, or approximately the same as the regulated output voltage $V_{OUT}$. Power switches SW1, SW2, SW3, and SW4 are switched ON and OFF to control the current supplied to the load 107 and, subsequently, the voltage at the load 107. To smooth pulses introduced by the power switches, an LC filter comprising inductor 109 and capacitor 111, is coupled between the unregulated input voltage $V_{SUPPLY}$ and the regulated output voltage $V_{OUT}$. In embodiments power switches SW1, SW2, SW3, and SW4 may be metal oxide field effect transistors (MOSFETs), bipolar junction transistors (BJTs), or any other suitable switching device.

The configuration of the power switches is determined by the fixed-frequency control circuit 105. Depending on the switch configurations, the switching regulator operates as one of three distinct converter types: a buck converter, a boost converter, or a buck-boost converter.

A buck converter down-converts an input voltage to a lower output voltage. The power switches operating in a buck converter configuration alternately connect and disconnect the input voltage $V_{SUPPLY}$ to the input of the LC filter. Power switch SW3 remains ON and power switch SW4 remains OFF in the buck converter configuration, while power switches SW1 and SW2 are alternately switched ON and OFF.

A boost converter, on the other hand, up-converts an input voltage $V_{SUPPLY}$ to a higher output voltage $V_{OUT}$. In the boost converter configuration, the input voltage $V_{SUPPLY}$ is continuously connected to the input of the LC filter at the terminal of inductor 109 through power switch SW1, but the opposite terminal of inductor 109 is alternately connected and disconnected from the load 107. Power switch SW1 is always ON and power switch SW2 is always OFF in the boost configuration, while power switches SW3 and SW4 are alternately switched ON and OFF.

A buck-boost converter switches between the buck-converter configuration and the boost converter configuration when the input voltage $V_{SUPPLY}$ is approximately the same as the regulated output voltage $V_{OUT}$.

Fixed-frequency control circuit 105 contains separate modules for controlling the operating mode of the switching regulator and for controlling the duration of time the switch positions remain unchanged. Operating mode generator 115 provides signal MODE at an output. Output signal MODE is determined at least by input signals CLK, $V_{REF}$, and $V_{SUPPLY}$. PWM controller 113 provides pulse-width modulated signal Q at an output. Q is a fixed frequency control signal that has a duty cycle that can vary from 0% to 100% of the entire period. Signal Q is generated based at least in part on input signals CLK, $V_{REF}$, $V_{OUT}$, and $I_L$. Input signals $V_{OUT}$ and $I_L$ are feedback signals from the buck-boost switching regulator 103. Depending on the PWM controller implemented, either feedback signal, $V_{OUT}$ or $I_L$ may be used, or both. Input signal $V_{REF}$ is the desired output voltage $V_{OUT}$ of buck-boost switching regulator 103. Fixed-frequency control circuit 105 further comprises switching circuit 117. Switching circuit 117 is used to manipulate signal MODE and pulse-width modulated signal Q to produce driving signals for power switches SW1, SW2, SW3, and SW4. Switching circuit 117 produces four driving signals at its outputs, driving signals DRV1 and DRV2, as well as their respective complements, $\overline{DRV1}$ and $\overline{DRV2}$.

Buck-Boost Switching Regulator Control

In a generalization, fixed-frequency control circuit 105 operates the buck-boost switching regulator 103 in a buck configuration when the input voltage $V_{SUPPLY}$ is higher than the desired output voltage $V_{REF}$. As mentioned before, the buck configuration acts as a step down voltage converter. Therefore, $V_{SUPPLY}$ is stepped down to adjust the output voltage to the desired level. On the other hand, when the input voltage $V_{SUPPLY}$ is lower than the desired output voltage, the fixed-frequency control circuit 105 operates the buck-boost switching regulator 103 in a boost configuration. The boost configuration, as suggested by the name, steps up the input voltage $V_{SUPPLY}$. Finally, when the input voltage $V_{SUPPLY}$ is approximately the same as the desired output voltage, that is, when the input supply voltage is within a predetermined range of the desired output voltage, the fixed-frequency control circuit 105 operates the buck-boost switch regulator 103 in both a buck and boost configuration, typically referred to as buck-boost. During the buck-boost mode of operation, the fixed-frequency control circuit 105 switches the configuration of the buck-boost switching regulator 103 from a buck configuration to a boost configuration.

Figure 2:
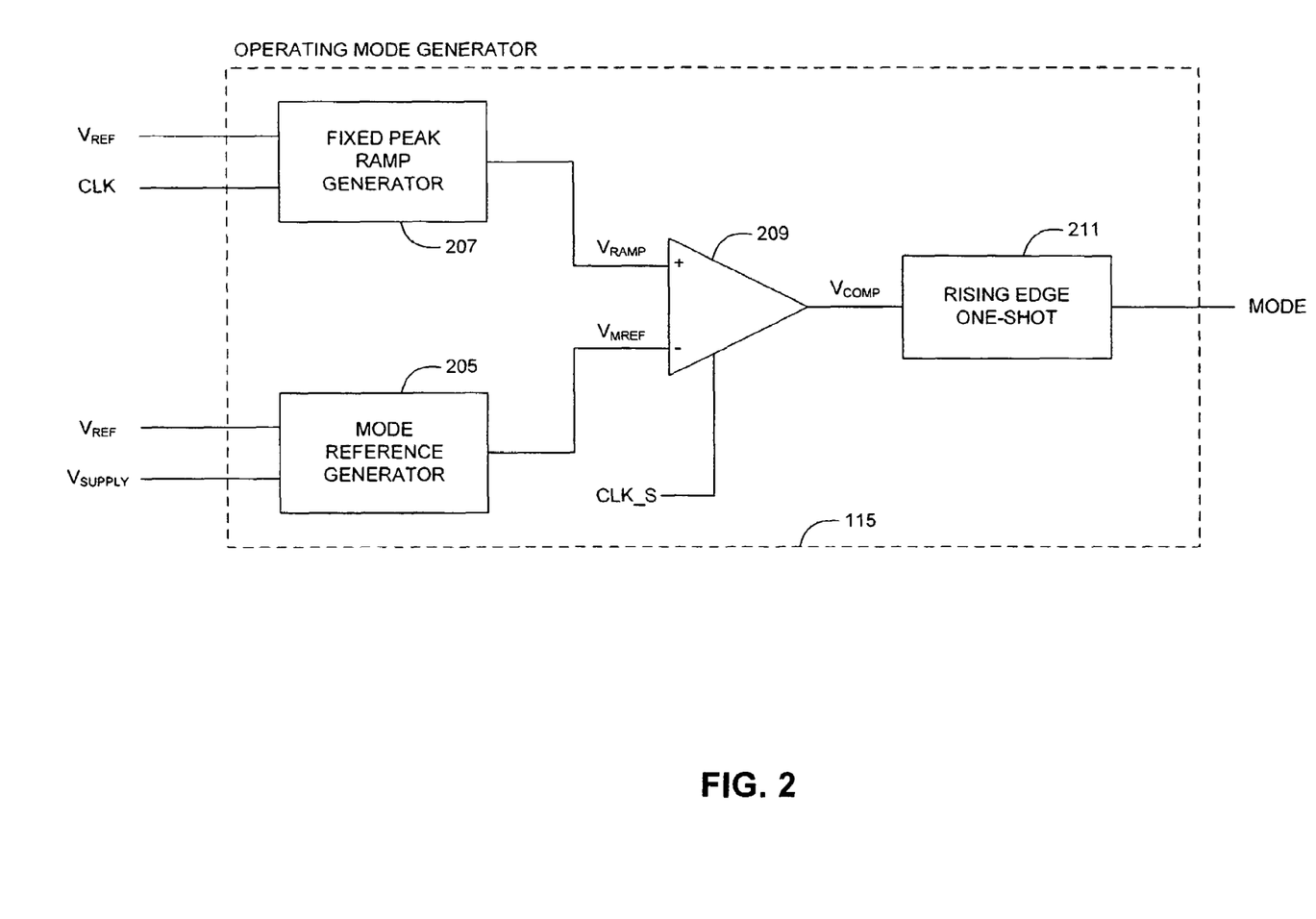
FIG. 2 is a block diagram of an operating mode generator according to an embodiment of the present invention.

FIG. 2 is an exemplary embodiment of operating mode generator 115. In the embodiment of FIG. 2, operating mode generator 115 comprises a mode reference generator 205, a fixed peak ramp generator 207, a comparator 209, and a rising edge one-shot module 211.

The fixed peak ramp generator 207 has two inputs, $V_{REF}$ and CLK, and generates a fixed peak waveform at the output. In embodiments, the fixed peak waveform is saw-tooth and the peak-to-peak amplitude is a predetermined value, $2*V_{bb}$, chosen to indicate the buck-boost region of operation. The buck-boost region, as previously mentioned, is indicative of the region where the input supply voltage $V_{SUPPLY}$ is approximately the same as the desired output voltage $V_{REF}$. The fixed peak saw-tooth waveform also preferably contains a DC offset for input common mode reasons.

Mode reference generator 205 has two inputs, $V_{REF}$ and $V_{SUPPLY}$, and generates a mode reference voltage $V_{MREF}$ at an output. The mode reference voltage produced at the output is equal to $V_{SUPPLY}-V_{REF}+V_{OFFSET}+V_{bb}$, where $V_{OFFSET}$ is the DC offset introduced in the fixed peak ramp generator for input common mode reasons. The mode reference voltage is indicative of how much higher or lower the input voltage $V_{SUPPLY}$ is relative to the desired output voltage $V_{REF}$.

Generated signals $V_{RAMP}$ and $V_{MREF}$ are compared to each other by comparator 209 to generate output signal $V_{COMP}$. In the embodiment of FIG. 2, $V_{RAMP}$ is coupled to the non-inverting input of comparator 209 and $V_{MREF}$ is coupled to the inverting input of comparator 209. The output signal $V_{COMP}$ is HIGH when the voltage of $V_{RAMP}$ is greater than the voltage of $V_{MREF}$, and LOW when the voltage of $V_{RAMP}$ is less than the voltage of $V_{MREF}$. Clock signal CLK_S of short periodic pulses is also input into compartor 209. During the short pulses of CLK_S, the output of comparator 209 is forced LOW.

Signal $V_{RAMP}$ is a saw-tooth waveform that divides the regions of operation for the buck-boost switching regulator. If $V_{MREF}$ is greater in value than signal $V_{RAMP}$, the buck-boost switching regulator operates in a buck configuration, or simply buck mode. Conversely, if $V_{MREF}$ is less than signal $V_{RAMP}$, the buck-boost switching regulator operates in a boost configuration, or simply boost mode. If $V_{MREF}$ is within the $2*V_{BB}$ fixed peak range of signal $V_{RAMP}$, the operating mode of the buck-boost switching regulator switches between buck mode and boost mode, hence the operating mode name buck-boost. Each of the three operating modes, buck, boost, and buck-boost will be explained in detail later with reference to FIGS. 6-11.

In the FIG. 2 embodiment of operating mode generator 115, the operating mode can be determined without any feedback being introduced from the buck-boost switching regulator 103. Furthermore, as would be appreciated by a person skilled in the relevant art, other configurations for operating mode generator 115 can be used with the present invention.

Figure 3:
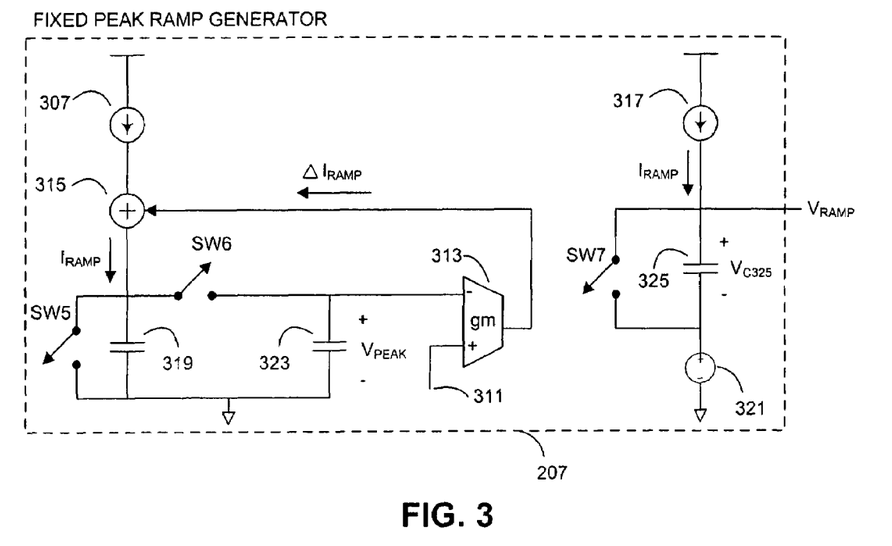
FIG. 3 is a circuit level representation of a fixed-peak ramp generator according to an embodiment of the present invention.

FIG. 3 is a circuit level representation of a fixed peak ramp generator 207 according to an embodiment of the present invention. Fixed peak ramp generator 207 includes two switches SW5 and SW6, capacitors 319 and 323, transconductance block 313, current adder 315 of current $\Delta I_{RAMP}$ and $I_{REF}$, where current $I_{REF}$ is provided by current source 307. In embodiments switches SW5 and SW6 may be MOSFETs, BJTs, or any other suitable switching device. Fixed peak ramp generator 207 forms a closed loop system that regulates the peak amplitude on capacitor 319. During operation, the peak voltage amplitude on capacitor 319 is sampled and stored on capacitor 323, labeled $V_{PEAK}$. The voltage stored on capacitor 323, $V_{PEAK}$, is placed on the inverting input of transconductance block 313. The non-inverting terminal of transconductance block 313 is connected to a reference voltage signal 311 of voltage value $2*V_{bb}$, where $2*V_{bb}$ is the predetermined voltage range indicative of the buck-boost region of operation. The loop will regulate the value of voltage $V_{PEAK}$ to be almost equal with reference voltage value $2*V_{bb}$.

Fixed-peak ramp generator 207 further includes a second system that is responsible for the actual generation of the fixed peak saw-tooth waveform $V_{RAMP}$ at the output. This second system includes a current source 317 that mirrors current $I_{RAMP}$ from the first closed loop system, switch SW7, capacitor 325, and ideal voltage source 321. In embodiments switch SW7 may be a MOSFET, BJT, or any other suitable switching device.

Figure 4:
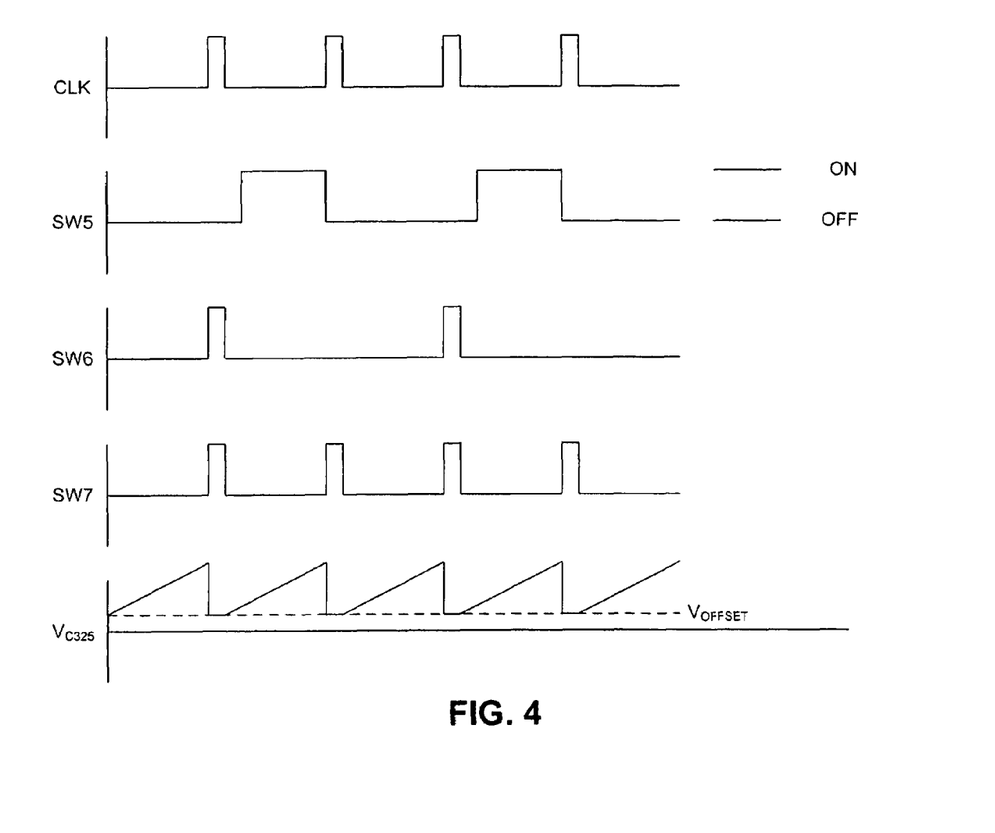
FIG. 4 is a graph of exemplary signals explaining operation of the fixed-peak ramp generator circuit of FIG. 3.

FIG. 4 explains the operation of fixed-peak ramp generator 207 in terms of timing diagrams of various signals/components. A fixed-frequency clock pulse CLK is provided to fixed peak ramp generator 207. When switch SW5 goes from ON to OFF, capacitor 319 will start to charge from zero volts. After exactly one clock period SW6 turns ON for a short time. During this short time the charge from capacitor 319 will redistribute between capacitor 319 and capacitor 323. After switch SW6 turns OFF, switch SW5 will turn ON resetting the voltage on capacitor 319 to zero volts. Capacitor 323 will keep the voltage given by the charge received from capacitor 319 during redistribution. Subsequently, switch SW5 will turn OFF again and the process is repeated.

After some number of cycles, the voltage on capacitor 323, $V_{PEAK}$, will reach a value when there will be no more charge redistribution between capacitor 319 and capacitor 323 during the short time switch SW6 is on. That means $V_{PEAK}$ will be equal with the peak voltage reached by capacitor 319 after being charged by current $I_{RAMP}$ in exactly one clock period. The loop will force the two inputs of transconductance block 313 to become almost equal, depending on the loop gain. Consequently, the current $I_{RAMP}$ will be adjusted by the loop such that $V_{PEAK}$ will be equal to $2*V_{bb}$ in value.

Current source 317, in the second system of fixed-peak ramp generator 207, mirrors current $I_{RAMP}$. In addition, the capacitance of capacitor 325 has the same value as capacitor 319. Given that current source 317 is providing a current equal to $I_{RAMP}$ and that capacitor 325 has an equivalent capacitance of capacitor 319, by switching switch SW7, as illustrated in FIG. 4, a saw-tooth waveform $V_{C325}$ can be obtained at the top terminal of capacitor 325. The waveform will have a fixed-peak amplitude equal to $2*V_{bb}$ and a DC offset equal to $V_{OFFSET}$ produced by ideal voltage source 321. As would be appreciated by a person skilled in the relevant art, ideal voltage source 321 can take on the form of any suitable component such as a diode.

Referring back to FIG. 2, output $V_{COMP}$ of comparator 209 is input into rising edge one-shot module 211. Rising edge one-shot module 211 manipulates the pulse width of $V_{COMP}$ to have a duration equal with a fraction of the clock period. In other words, the output signal of rising edge one-shot module 211, MODE, has a pulse width that will not exceed the pulse width of input signal $V_{COMP}$ and will be limited to a fractional value of the clock period.

Figure 5:
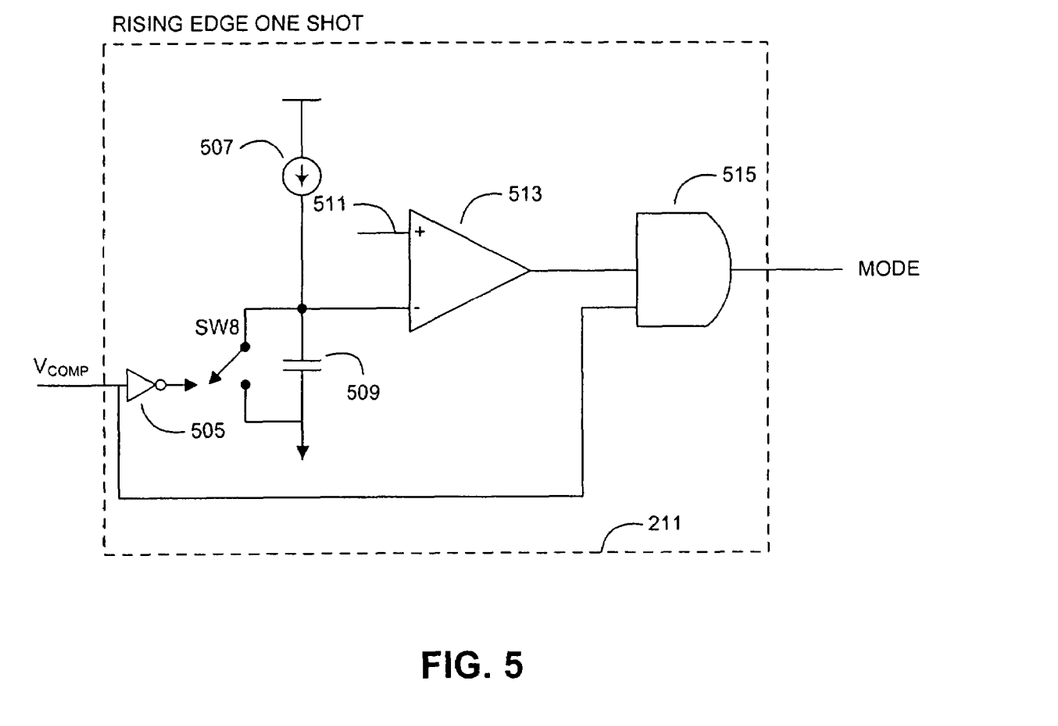
FIG. 5 is a circuit level representation of a rising edge one-shot circuit according to an embodiment of the present invention.

The functionality of rising edge one-shot circuit 211 can be implemented in many different ways. FIG. 5 is an exemplary embodiment of a circuit level representation of rising edge one-shot module 211. Rising-edge one-shot module 211 comprises inverter 505 at the input, switch SW8, capacitor 509, current source 507, reference voltage $V_{PEAK}$ 511, comparator 513, and logic AND gate 515. In embodiments switch SW8 may be a MOSFET, BJT, or any other suitable switching device. As would be appreciated by a person skilled in the relevant art, other configurations for rising edge one-shot circuit 211 can be used with the present invention.

In the example of FIG. 5, signal $V_{COMP}$ comes from the output of comparator 209 in FIG. 2 and is input into rising edge one-shot circuit 211. At the rising edge of signal $V_{COMP}$ (i.e., a LOW to HIGH transition) switch SW8 will switch from ON to OFF. Subsequently, capacitor 509 will begin to charge from zero volts, with current source 507 supplying the power. Current source 507 mirrors current $I_{RAMP}$ (see FIG. 3), and the capacitance of capacitor 509 is set to a fractional value k of capacitor 319 (see FIG. 3). This fractional value k allows for the pulse duration of the one shot circuit to be set equal to k*P, where P is the period of signal CLK in FIG. 4, as well as the period of the saw-tooth waveform $V_{C325}$ (see FIG. 4). At the moment switch SW8 switches from ON to OFF, and capacitor 509 begins charging, output signal MODE will transition from LOW to HIGH. After a time equal with k*P in duration, the output of comparator 209 will go LOW, forcing output signal MODE back LOW. Consequently, rising edge one shot 211 limits the pulse duration of $V_{COMP}$ to a time duration of k*P.

Figure 6:
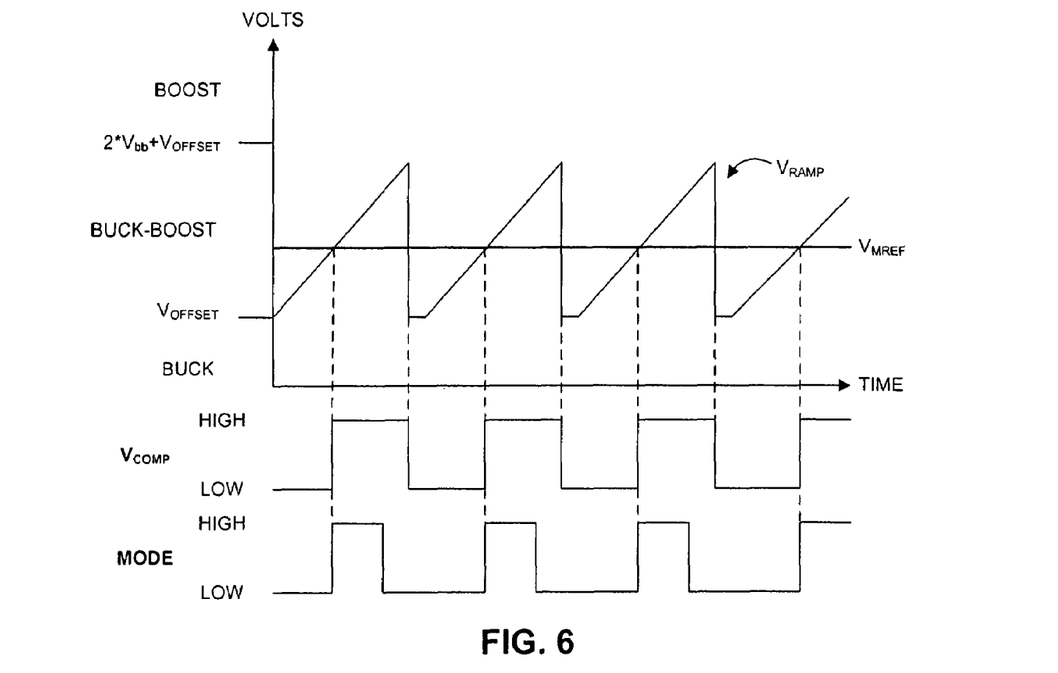
FIG. 6 is a graph of exemplary signals explaining operation in buck-boost mode of the operating mode generator of FIG. 2.
Figure 7:
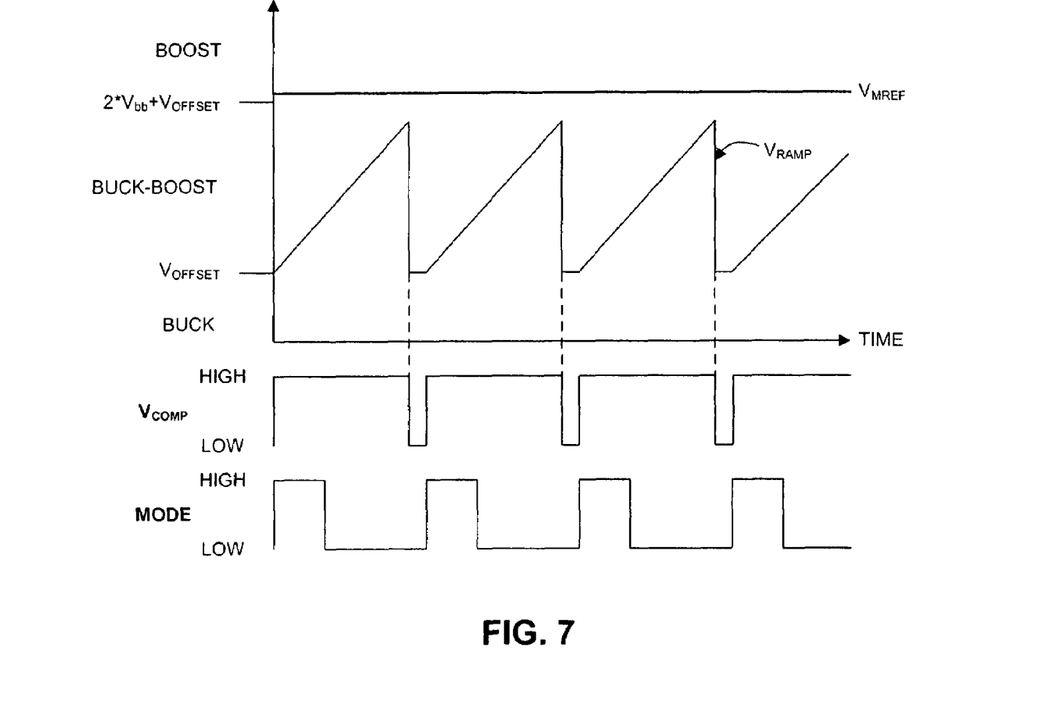
FIG. 7 is a graph of exemplary signals explaining operation in pure buck mode of the operating mode generator of FIG. 2.
Figure 8:
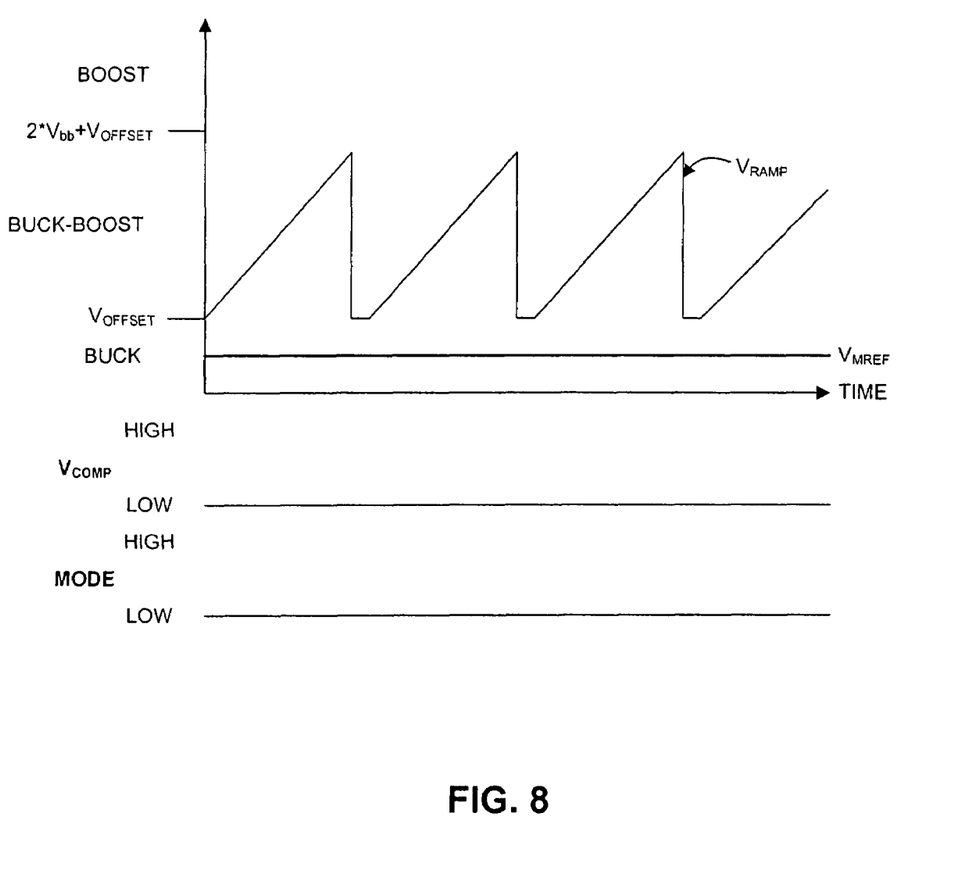
FIG. 8 is a graph of exemplary signals explaining operation in pure boost mode of the operating mode generator of FIG. 2.

FIGS. 6-8 are exemplary signal diagrams of signal $V_{MREF}$ being compared to signal $V_{RAMP}$ by comparator 209 (see FIG. 2), and the resulting output signal $V_{COMP}$. FIGS. 6-8 also illustrate the resulting MODE signal generated from rising edge one-shot module 211.

Modes of Operation

Referring now to FIG. 6, $V_{MREF}$ is shown within the voltage range $V_{OFFSET}$ to $2*V_{bb}+V_{OFFSET}$. Therefore $V_{MREF}$ is in the buck-boost range of operation and output signal MODE alternates from HIGH to LOW within a single period of the saw-tooth waveform $V_{RAMP}$. In the buck-boost mode of operation signal $V_{MREF}$, which is proportional to the difference between the unregulated input voltage $V_{SUPPLY}$ and the desired output voltage $V_{REF}$, is going above and below signal $V_{RAMP}$ within a single cycle. Therefore, $V_{COMP}$ goes from HIGH to LOW within the same cycle and signal MODE follows in the same manner.

FIG. 7 shows signal $V_{MREF}$ as always being above sawtooth waveform $V_{RAMP}$. In this example, the input voltage $V_{SUPPLY}$ is below the desired output voltage $V_{REF}$. As a result, the circuit operates in pure boost mode. In this case, signal $V_{COMP}$ is always HIGH, except during the short clock pulses when it will be forced low. Comparing the MODE signal of FIG. 6 to the MODE signal of FIG. 7, the rising edge of signal MODE will move from the end of the period towards the beginning of the period as $V_{SUPPLY}$ moves from above $V_{REF}$ towards below $V_{REF}$.

FIG. 8 shows a condition in which buck-boost switching regulator 103 operates in pure buck mode. $V_{MREF}$ is always below $V_{RAMP}$, indicating that $V_{SUPPLY}$ is greater than $V_{REF}$ and, as a result, signal $V_{COMP}$ and signal $V_{MODE}$ are always low. With $V_{MODE}$ LOW, buck-boost switching regulator 103 operates in pure buck mode.

Driving Logic

Figure 9:
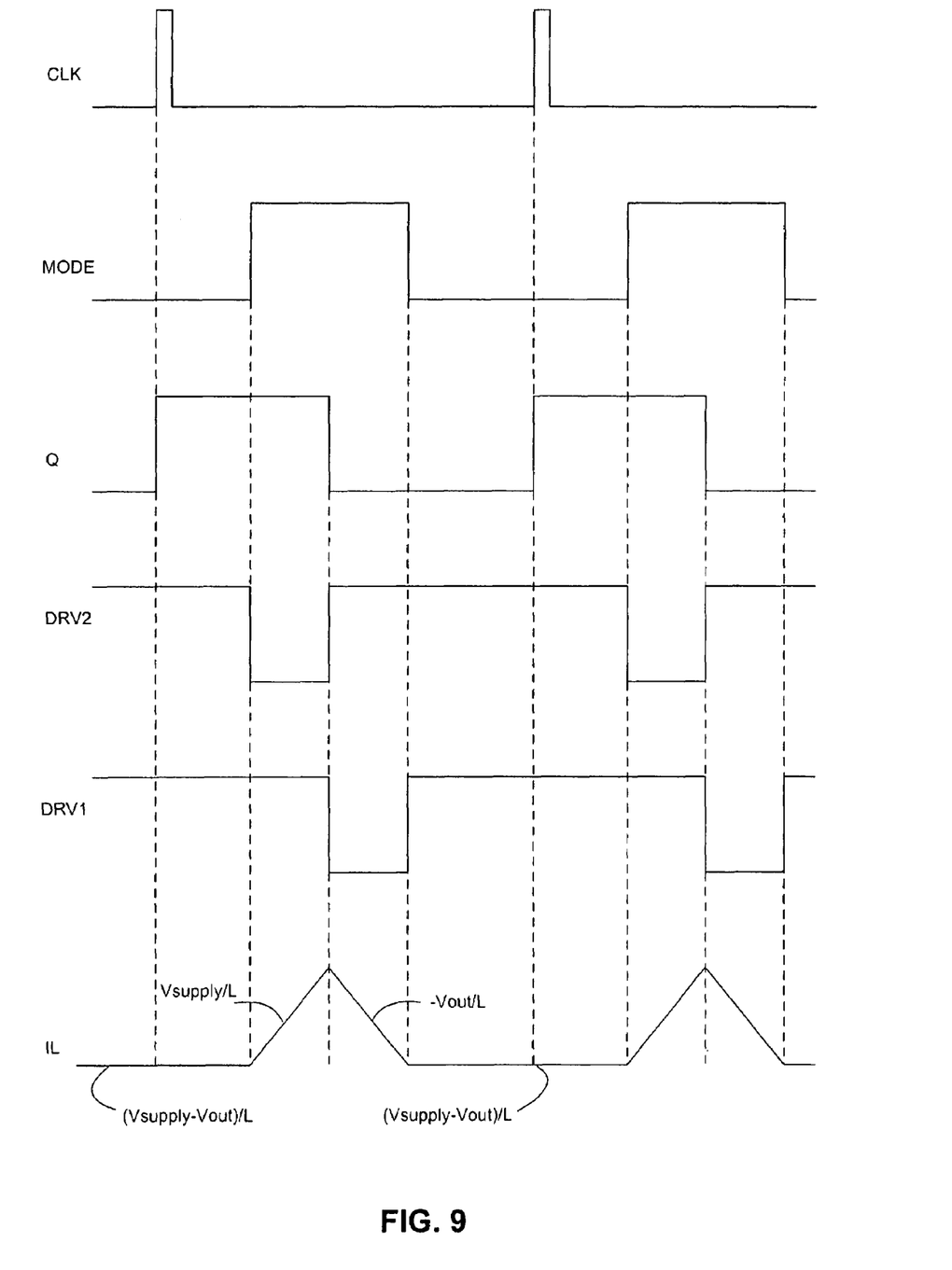
FIG. 9 is a graph of exemplary signals explaining operation of the buck-boost switching regulator and control circuit of FIG. 1 when the supply voltage is substantially the same as the output voltage (i.e., buck-boost mode).
Figure 10:
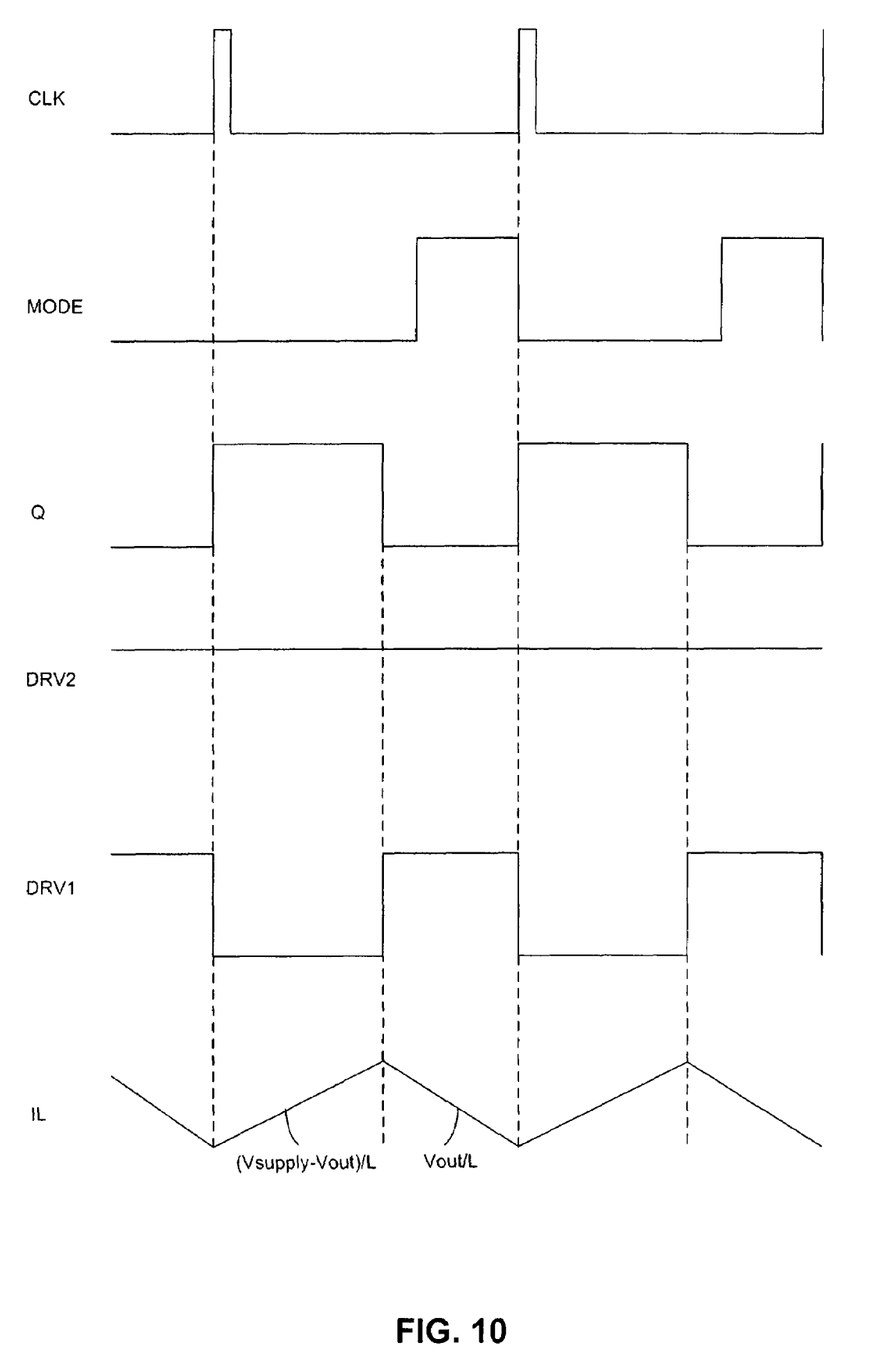
FIG. 10 is a graph of exemplary signals explaining operation of the buck-boost switching regulator and control circuit of FIG. 1 when the supply voltage is greater than the output voltage (i.e., buck mode).
Figure 11:
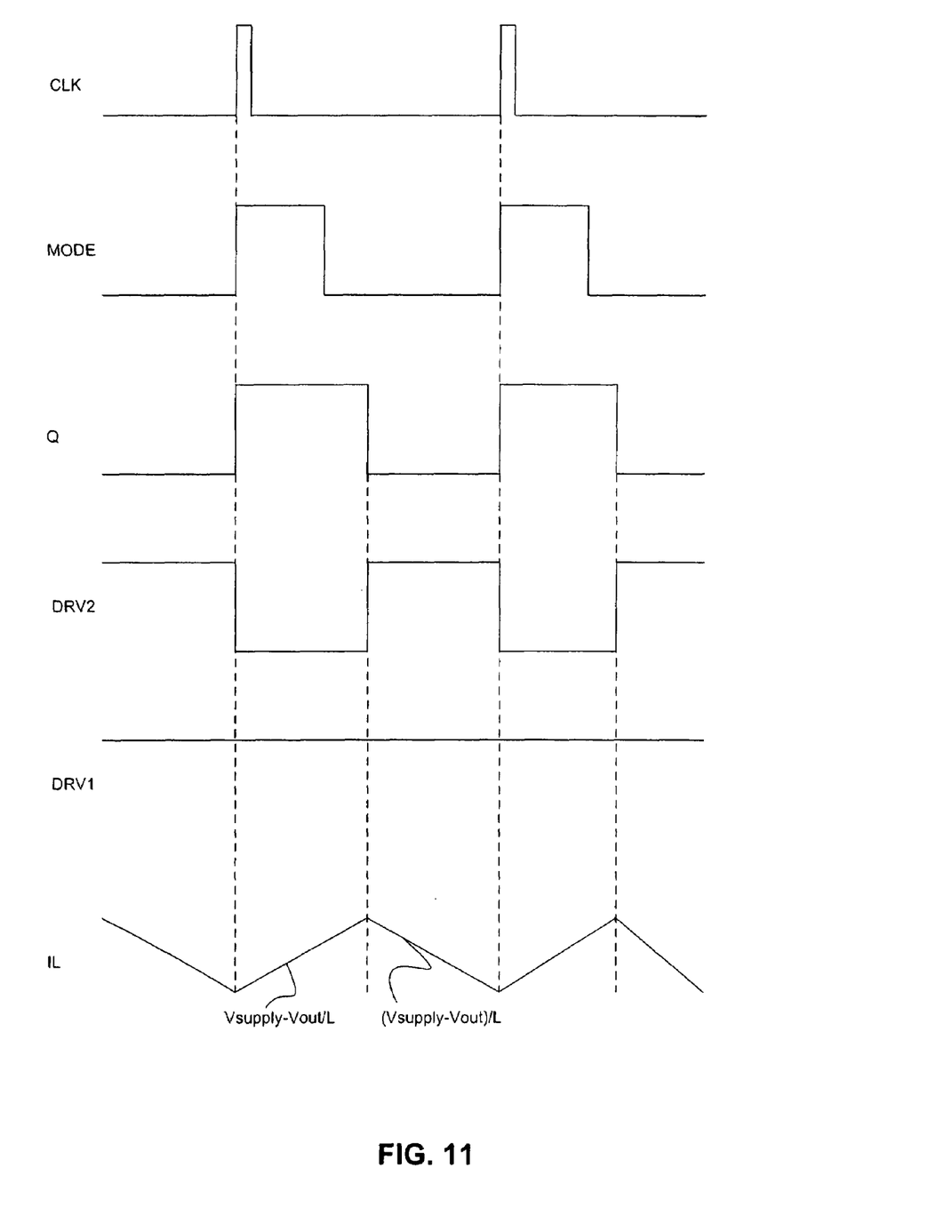
FIG. 11 is a graph of exemplary signals explaining operation of the buck-boost switching regulator and control circuit of FIG. 1 when the supply voltage is less than the output voltage (i.e., boost mode).

FIGS. 9-11 are exemplary illustrations of the functionality of switching circuit 117 shown in FIG. 1, as well as the resulting current through inductor 109, for each of the three modes of operation. Switching circuit 117 of FIG. 1 provides driving signals DRV1 and DRV2, and their respective complements to power switches SW1, SW2, SW3, and SW4. Power switches SW1 and SW2 are mutually exclusive to one another; meaning when one is ON the other is OFF. Power switches SW3 and SW4 are likewise mutual exclusive in state. Driving signals DRV1, $\overline{DRV1}$, DRV2, and $\overline{DRV2}$, are correspondingly coupled to power switches SW1, SW2, SW3, and SW4, as shown in FIG. 1.

FIG. 9 illustrates the resulting driving signals, DRV1 and DRV2, generated by switching circuit 117, given signals MODE and Q as shown. Signal Q, generated from PWM controller 113 of FIG. 1, is given a duty cycle of 50% for exemplary purposes. Signal MODE, as shown, indicates that the switching regulator 103 is to operate in buck-boost mode. In the example of FIG. 9, diving signal DRV1 is LOW only if the falling edge of signal Q appears before the falling edge of MODE within the same clock period. The falling edge of signal DRV1 occurs at approximately the same time as the falling edge of Q, and the rising edge of DRV1 is the falling edge of MODE. If signal MODE is always LOW, signifying pure buck mode, the rising edge of DRV1 will coincide with the next rising edge of the clock pulse CLK. Driving signal DRV2 is LOW only if the rising edge of signal MODE appears before the falling edge of signal Q within the same clock period. The falling edge of signal DRV2 occurs at approximately the same time as the rising edge of MODE, and the rising edge of DRV2 corresponds to the falling edge of Q.

The resulting inductor current $I_L$, as shown in FIG. 1, will follow the waveform shown in FIG. 9. It can be seen from waveform $I_L$ that charging and discharging of inductor 109 happens mainly during the times DRV1 and DRV2 are LOW and not during the whole period. This functionality of driving signals DRV1 and DRV2 helps increase the overall efficiency of the buck-boost controller when operating in buck-boost mode by keeping the average inductor current close to the output current and, therefore, minimizing conduction losses.

FIG. 10 is a graph of exemplary signals for the buck-boost switching regulator of FIG. 1 operating in buck mode. Since the rising edge of signal MODE is after the falling edge of signal Q, signal DRV2 is always high and signal DRV1 becomes the complement of Q. With driving signal DRV2 always HIGH, power switch SW3 is always ON and the load 107 is always connected to the LC filter. The input voltage $V_{SUPPLY}$ is alternately connected and disconnected from the input of the LC filter via power switches SW1 and SW2. When the input voltage $V_{SUPPLY}$ is connected across the filter, the voltage across inductor 109 is equal to $V_{SUPPLY}-V_{OUT}$, and the change in current through inductor 109 with respect to time is therefore equal to $(V_{SUPPLY}-V_{OUT})/L$. Since the regulator is operating in buck mode, the input voltage $V_{SUPPLY}$ is greater than the desired output voltage $V_{REF}$, and the current $I_L$ through inductor 109 increases in the positive direction. When the input voltage $V_{SUPPLY}$ is alternately disconnected from the input of the LC filter, the load 107 is shorted to ground through the LC filter, and the change in current with respect to time through inductor 109 is therefore equal to $-V_{OUT}/L$.

FIG. 11 illustrates the waveforms for the particular case of pure boost mode. Since the falling edge of MODE occurs before the falling edge of signal Q, signal DRV1 is always high and signal DRV2 becomes the complement of signal Q. With driving signal DRV1 always HIGH, power switch SW1 is always ON and the input voltage $V_{SUPPLY}$ is always connected to the input of the LC filter. The load 107 is alternately connected and disconnected from inductor 109. When the load 107 is connected to inductor 109, the voltage across inductor 109 is equal to $V_{SUPPLY}-V_{OUT}$, and the change in current with respect to time through inductor 109 is therefore $(V_{SUPPLY}-V_{OUT})/L$. Operating in boost mode, the input voltage $V_{SUPPLY}$ is less than the desired output voltage $V_{REF}$ and the current through inductor 109 decreases. When the load 107 is alternately disconnected from inductor 109 of LC filter, inductor 109 of the LC filter is shorted to ground, and the change in current through inductor 109 is equal to $V_{SUPPLY}/L$, an increasing current.

In general, when driving signal DRV1 is always HIGH, the switching regulator operates in the boost mode of operation, and when driving signal DRV2 is always HIGH, the switching regulator operates in the buck mode of operation.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A switching regulator for providing a regulated output voltage from an unregulated input voltage, the regulated output voltage being substantially equal to a reference voltage, the switching regulator comprising:

controller logic configured to provide a control signal having a duty-cycle that is a function of a feedback signal and the reference voltage;

a mode generator configured to provide a mode signal, the mode generator comprising:

a ramp generator configured to provide a fixed peak waveform;

a mode reference generator configured to provide a mode reference voltage based on a difference between the unregulated input voltage and the reference voltage; and comparator circuitry configured to compare the fixed peak waveform and the mode reference voltage to provide the mode signal;

switching logic configured to receive the mode signal and the control signal and provide driving signals; and a power switch arranged in a circuit and configured to be controlled by the driving signals.

2. The switching regulator of claim 1, wherein the feedback signal is proportional to a current flowing through an inductor that is intermittently coupled between the unregulated input voltage and the regulated output voltage.

3. The switching regulator of claim 1, wherein the feedback signal is proportional to the regulated output voltage.

4. The switching regulator of claim 1, wherein the control signal is a pulse-width modulated signal.

5. The switching regulator of claim 1, wherein the power switch is driven to operate in at least one of a buck mode, a boost mode, and a buck-boost mode.

6. The switching regulator of claim 1, wherein the mode generator further comprises:

a one shot pulse circuit configured to receive the mode signal and provide a final mode signal that has a series of pulses, wherein each pulse corresponds to a transition of a pre-determined type within the initial mode signal.

7. The switching regulator of claim 6, wherein the predetermined transition type of the one shot pulse circuit is a rising edge.

8. The switching regulator of claim 1, wherein the fixed peak waveform is a sawtooth waveform.

9. A switching regulator for providing a regulated output voltage from an unregulated input voltage, the regulated output voltage being substantially equal to a reference voltage, the switching regulator comprising:

controller logic configured to provide a control signal having a duty-cycle that is a function of a feedback signal and the reference voltage;

a mode generator configured to provide a mode signal, the mode generator comprising:

a ramp generator configured to provide a fixed peak waveform;

a mode reference generator configured to provide a mode reference voltage based on a difference between the unregulated input voltage and the reference voltage; and comparator circuitry configured to compare the fixed peak waveform and the mode reference voltage to provide the mode signal; and switching logic configured to determine a driving signal based on a temporal relationship between a falling edge of the mode signal and a falling edge of the control signal.

10. The switching regulator of claim 9, wherein the feedback signal is proportional to a current flowing through an inductor that is intermittently coupled between the unregulated input voltage and the regulated output voltage.

11. The switching regulator of claim 9, wherein the feedback signal is proportional to the regulated output voltage.

12. The switching regulator of claim 9, wherein the control signal is a pulse-width modulated signal.

13. The switching regulator of claim 9, wherein the mode generator further comprises:

a one shot pulse circuit configured to receive the mode signal and provide a final mode signal that has a series of pulses, wherein each pulse corresponds to a transition of a pre-determined type within the initial mode signal.

14. The switching regulator of claim 13, wherein the predetermined transition type of the one shot pulse circuit is a rising edge.

15. The switching regulator of claim 9, wherein the fixed peak waveform is a sawtooth waveform.

16. The switching regulator of claim 9, further comprising:
a power switch coupled between the unregulated input voltage and an inductor, the power switch configured to receive the driving signal.

17. The switching regulator of claim 9, further comprising:
a power switch coupled between the regulated output voltage and an inductor, the power switch configured to receive the driving signal.

* * * * *